(12) United States Patent
Hiyoshi et al.

(10) Patent No.: US 6,595,186 B2
(45) Date of Patent: Jul. 22, 2003

(54) CONTROL SYSTEM AND METHOD FOR AN INTERNAL COMBUSTION ENGINE

(75) Inventors: Ryosuke Hiyoshi, Kanagawa (JP); Shunichi Aoyama, Kanagawa (JP); Kenshi Ushijima, Kanagawa (JP); Katsuya Moteki, Tokyo (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/230,066

(22) Filed: Aug. 29, 2002

(65) Prior Publication Data
US 2003/0051685 A1 Mar. 20, 2003

(30) Foreign Application Priority Data
Sep. 18, 2001 (JP) ........................................ 2001-282924

(51) Int. Cl.$^7$ .................................................. F01L 1/34
(52) U.S. Cl. ................ 123/406.29; 123/78 E; 123/90.15
(58) Field of Search ................... 123/78 E, 90.15, 123/406.29

(56) References Cited

U.S. PATENT DOCUMENTS

| 5,870,992 | A | * | 2/1999 | Kamura et al. | ............. | 123/305 |
| 6,209,515 | B1 | * | 4/2001 | Gotoh et al. | ................ | 123/305 |
| 6,386,177 | B2 | * | 5/2002 | Urushihara et al. | ......... | 123/299 |
| 6,397,800 | B2 | * | 6/2002 | Nohara et al. | ........... | 123/90.15 |
| 2001/0015192 | A1 | * | 8/2001 | Urushihara et al. | ......... | 123/299 |
| 2001/0025615 | A1 | * | 10/2001 | Nohara et al. | ........... | 123/90.15 |

FOREIGN PATENT DOCUMENTS

| JP | 5-059273 | 8/1993 |
| JP | 6-035842 | 5/1994 |
| JP | 6-092746 | 11/1994 |
| JP | 7-113332 | 6/1995 |
| JP | 7-116956 | 12/1995 |
| JP | 8-033112 | 3/1996 |

* cited by examiner

Primary Examiner—Henry C. Yuen
Assistant Examiner—Douglas A. Salser
(74) Attorney, Agent, or Firm—Foley & Lardner

(57) ABSTRACT

A control system for an internal combustion engine is provided which comprises a compression ratio control mechanism and a control unit for controlling the compression ratio control mechanism. The control unit including an acceleration parameter obtaining section for obtaining an acceleration parameter corresponding to a change of an engine speed, an acceleration determining section for determining whether the engine is in a slow or fast acceleration state on the basis of the acceleration parameter, and a control section for controlling at least one of a compression ratio change speed at which the engine compression ratio during engine acceleration is changed and a compression ratio change start time at which a change of the engine compression ratio during engine acceleration is started, on the basis of whether the engine is in a slow or fast acceleration state. A control method is also provided.

21 Claims, 8 Drawing Sheets

ACCELERATION PATTERN
AT SLOW AND FAST ACCELERATION

COMPRESSION RATIO DECREASE PERIOD OF
COMPRESSION RATIO CONTROL ACTUATOR

COMPRESSION RATION DECREASE PATTERN
OF COMPRESSION RATIO CONTROL ACTUATOR

COMPRESSION RATIO DECREASE PATTERN
AT FAST ACCELERATION

CONTROL SYSTEM AND METHOD FOR AN INTERNAL COMBUSTION ENGINE

BACKGROUND OF THE INVENTION

The present invention relates to a control system for an internal combustion engine having a compression ratio control mechanism capable of changing an engine compression ratio.

Heretofore, for a variable control of an engine compression ratio through a variable control of a piston stroke, i.e., a volume of a combustion chamber of a reciprocative-piston internal combustion engine, the following techniques (a) to (f) are known.

(a) When engine knock is detected, an engine compression ratio is first lowered. Then, an ignition timing is delayed when engine knock is still detected as disclosed in Japanese patent publication No. 5-59273.

(b) Combustion condition control factors are controlled in accordance with a difference of a detected engine compression ratio from a target engine compression ratio as disclosed in Japanese patent publication No. 6-92746.

(c) An engine operating condition is detected to determine a target engine compression ratio, and an engine compression ratio is changed step by step from the present engine compression ratio to the target engine compression ratio as disclosed in Japanese patent publication No. 7-113332.

(d) An engine operating condition is detected to determine a target engine compression ratio, and when the difference between the present engine compression ratio and the target engine compression ratio is larger than a predetermined value, the correction width for correction of the target engine compression ratio is made larger on the compression ratio decrease side than on the compression ratio increase side as disclosed in Japanese patent publication No. 7-116956.

(e) The correction value of the engine compression ratio is determined in accordance with the frequency of engine knock and stored to execute a compression ratio control as disclosed in Japanese patent publication No. 8-33112.

(f) An engine compression ratio is decreased when a combustion pressure detected by a combustion pressure sensor increases above a first set value and increased when the combustion pressure decreases below the first set value as disclosed in Japanese patent publication No. 6-35842.

SUMMARY OF THE INVENTION

In the engine having a compression ratio control mechanism, the engine compression ratio is preferably decreased to avoid engine knock at engine acceleration at which the engine speed increases. However, the compression ratio control actuator that actuates the compression ratio control mechanism is operated at a predetermined response speed and though needless to say, the response speed has a limit irrespective of whether the actuator is of the motor-driven type or of the hydraulically driven type. Accordingly, when the engine compression ratio cannot be changed at a desired response speed in response to a variation of the vehicle speed as at fast acceleration, i.e., when the response speed of the compression control actuator is lower than a required speed, knock may possibly be caused during engine acceleration. On the other hand, when the response speed of the compression ratio control actuator is too fast as at slow acceleration, the engine compression ratio is decreased largely though the vehicle has not yet been accelerated sufficiently, thus making it impossible to obtain a desired engine torque.

In the above described techniques (a) to (f), a combustion pressure or the like corresponding to engine knock during engine acceleration is detected and on the basis of the result of detection a control for decreasing the engine compression ratio is started, or the engine operating condition is detected to determine a target engine compression ratio and the engine compression ratio is controlled so as to become closer to the target compression ratio. For this reason, the time at which decrease of the engine compression ratio is started in response to engine acceleration is liable to be delayed. Accordingly, the engine compression ratio cannot be changed at a required speed, thus causing a possibility of engine knock. Thus, it is necessary to execute a control for preventing engine knock such as retardation of the ignition timing frequently, or it is necessary to make sufficiently faster the speed at which the compression ratio is varied. When this is the case, an increase in size of the compression ratio control actuator and an increase in energy consumption are incurred. Further, in case the speed at which the engine compression ratio during engine acceleration is decreased stepwise for the purpose of making smaller a variation of engine torque due to a decrease of the engine compression ratio during engine acceleration, there is a possibility that the stepwise decreasing speed of the engine compression ratio is deviated from an ideal speed to cause engine knock. To avoid this, it is also necessary to execute retardation of the ignition timing or the like control frequently.

The present invention has been made in view of the foregoing problems and has its object to provide a control system for an internal combustion engine that can avoid engine knock during engine acceleration assuredly and can suppress a torque variation and a decrease of fuel consumption effectively.

To achieve the above object, there is provided according to an aspect of the present invention a control system for an internal combustion engine comprising a compression ratio control mechanism capable of changing an engine compression ratio, and a control unit for controlling the compression ratio control mechanism in accordance with an acceleration state of the engine, the control unit including an acceleration parameter obtaining section for obtaining an acceleration parameter corresponding to a change of an engine speed, an acceleration determining section for determining whether the engine is in a slow or fast acceleration state on the basis of the acceleration parameter, and a control section for controlling at least one of a compression ratio change speed at which the engine compression ratio during engine acceleration is changed and a compression ratio change start time at which a change of the engine compression ratio during engine acceleration is started, on the basis of whether the engine is in a slow or fast acceleration state.

According to another aspect of the present invention, there is provided a control system for an internal combustion engine comprising a compression ratio control mechanism capable of changing an engine compression ratio, acceleration parameter obtaining means for obtaining an acceleration parameter corresponding to a change of an engine speed, acceleration determining means for determining whether the engine is in a slow or fast acceleration state on the basis of the acceleration parameter, and control means for controlling at least one of a compression ratio change speed at which the engine compression ratio during engine acceleration is changed and a compression ratio change start time at which a change of the engine compression ratio during engine acceleration is started, on the basis of whether the engine is in a slow or fast acceleration state.

According to a further aspect of the present invention, there is provided A control method for an internal combustion engine having a compression ratio control mechanism capable of changing an engine compression ratio, the control method comprising obtaining an acceleration parameter corresponding to a change of an engine speed, determining whether the engine is in a slow or fast acceleration state on the basis of the acceleration parameter, and controlling at least one of a compression ratio change speed at which the engine compression ratio during engine acceleration is changed and a compression ratio change start time at which a change of the engine compression ratio during engine acceleration is started on the basis of whether the engine is in a slow or fast acceleration state.

SUMMARY OF THE INVENTION

DESCRIPTION OF THE PREFERRED EMBODIMENT

Figure 8:
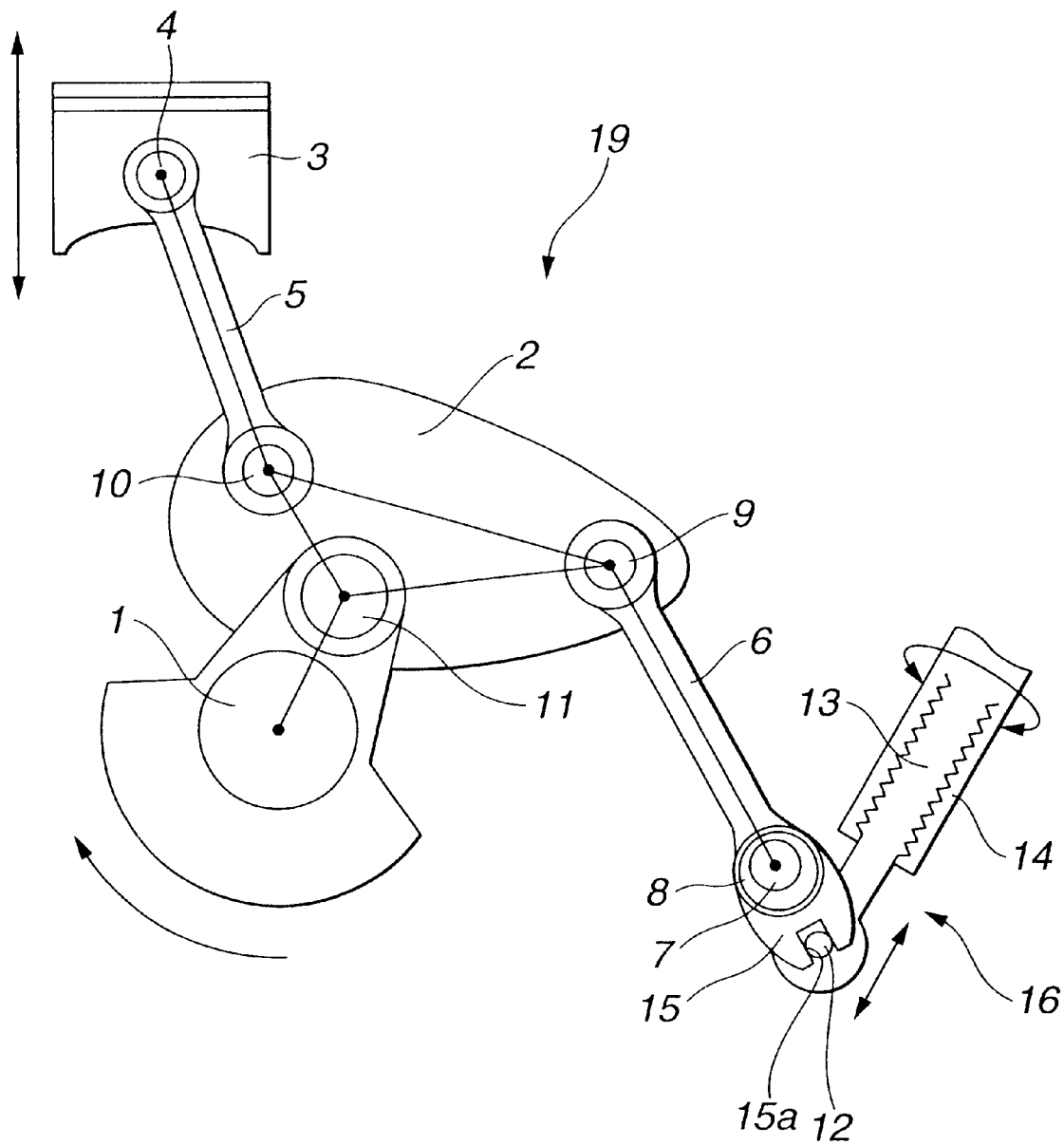
FIG. 8 is a schematic view of a compression ratio control mechanism in which the present invention is embodied.

Referring first to FIG. 8, a control system according to an embodiment of the present invention comprises compression ratio control mechanism 19 that is capable of changing an engine compression ratio. Compression ratio control mechanism 19 includes lower link 2 and upper link 5. Lower link 2 is pivotally or swingably connected to crankpin 11 of crankshaft 1. Upper link 5 is pivotally or swingably connected at one end to piston 3 by way of piston pin 4 and at the other end to lower link 2 by way of first connecting pin 10. Crankshaft 1 is rotatably mounted on a cylinder block (not shown) of an internal combustion engine by way of main bearings (not shown). Piston 3 is subjected to a combustion load, and the combustion load is transmitted from piston 3 to crankshaft 1 while being converted into a rotational power by way of upper link 5 and lower link 2.

To lower link 2 is pivotally or swingably connected an end of control link 6 by way of connecting pin 9. The other end of control link 6 is pivotally or swingably supported on eccentric cam 8. Eccentric cam 8 is fixedly attached to or otherwise formed integral with control shaft 7 that is rotatably supported on a cylinder block (not shown) so as to be eccentric with control shaft 7. Electric compression ratio control actuator 16 that drives and holds control shaft 7 includes tubular sled drive member 14 that is driven to rotate about an axis thereof and rod-shaped sled driven member 13 that is meshed with an inner circumferential gear portion of sled drive member 14 and driven to move axially thereof in response to rotation of sled drive member 14. Control shaft pin 12 that is attached to an end of sled driven member 13 is slidably engaged in slide groove 15a of control plate 15 that is fixedly attached to control shaft 7 to pivot or swing together therewith. By driving control shaft 7 in accordance with an engine operating condition by means of compression ratio control actuator 16, a piston stroke with respect to a crank angle is changed thereby changing the engine compression ratio.

Figure 9:
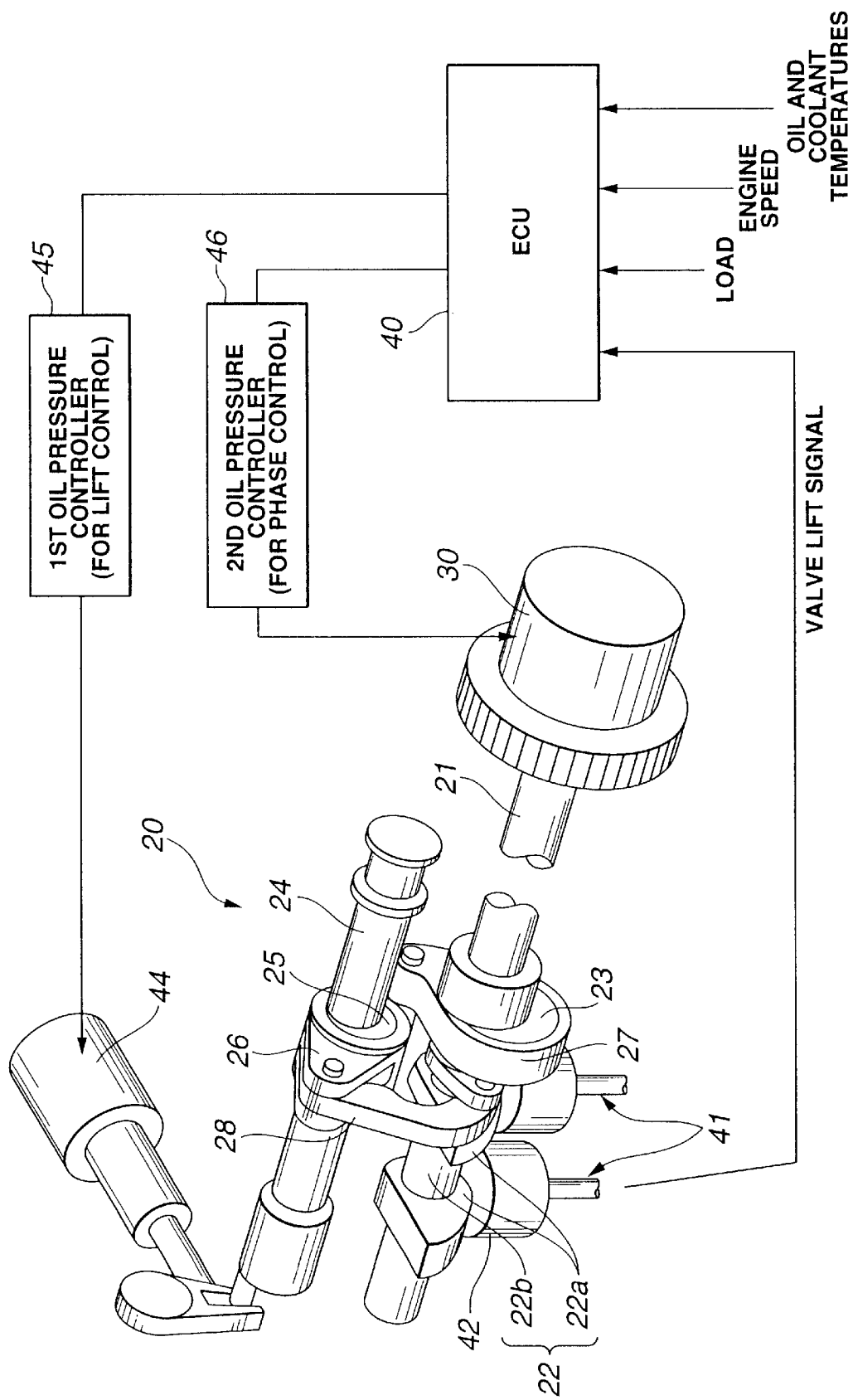
FIG. 9 is a schematic perspective view of a variable valve control apparatus having a lift and operation angle control mechanism and a phase control mechanism, in which the present invention is embodied.

Referring to FIGS. 9 and 10, the control system of the present invention further includes a variable valve timing control apparatus that is capable of varying valve lift characteristics of intake valve 41. Namely, the variable valve timing control apparatus includes lift and operation angle control mechanism 20 capable of changing a lift and operation angle of intake valve 41 and phase control mechanism 30 capable of changing a maximum lift phase of intake valve 41.

To intake drive shaft 21 is transmitted a rotational power from crankshaft 1 (refer to FIG. 8) by way of a pulley or sprocket (not shown). Intake drive shaft 21 is thus driven to rotate about an axis thereof in response to rotation of crankshaft 1. Oscillation cam 22 includes a pair of cam main bodies 22a, 22a and hollow cylindrical journal portion 22b interposed between cam main bodies 22a, 22a to connect the same thereby constitute an integral unit. Between each cam main body 22a and a valve stem of each intake valve 41 is interposed valve lifter 42. Oscillation cam 22 is operatively connected to intake drive shaft 21 by way of lift and operation angle control mechanism 20 which will be described later and adapted to oscillate within a predetermined oscillation range.

Lift and operation angle control mechanism 20 includes eccentric drive shaft portion 23 that is cylindrical or hollow cylindrical and fixedly attached to or otherwise formed integral with intake drive shaft 21 so as to be eccentric with intake drive shaft 21, control shaft 24 disposed in parallel with intake drive shaft 21 and elongated in the direction along which engine cylinders (not shown) are arranged, eccentric control shaft portion 25 that is cylindrical or hollow cylindrical and fixedly attached to or otherwise formed integral with control shaft 24 so as to be eccentric with control shaft 24, rocker arm 26 pivotally or swingably supported on eccentric control shaft portion 25, first link 27 connecting between an end of rocker arm 26 and eccentric drive shaft portion 23 and second link 28 connecting between another end of rocker arm 26 and an end of oscillation cam 22.

Rotation of intake drive shaft 21 in timed relation to crankshaft 1 causes an end of first link 27 supported on eccentric drive shaft portion 23 to pivot or swing about an axis of intake drive shaft 21. This causes rocker arm 26 to oscillate. This oscillation of rocker arm 26 causes oscillation cam 22 to oscillate within a predetermined oscillation angle range. This causes valve lifter 42 to move up and down, causing intake valve to open and close. When the rotational position or phase of control shaft 24 is changed by operation angle control actuator 44, the center of oscillation of rocker arm 26 installed on eccentric control shaft portion 25 pivots or swings about the axis of control shaft 24, i.e., the initial position of rocker arm 26 is changed. This causes the initial position (phase at the center of the oscillation range) of oscillation cam 22 to be changed by way of first and second links 27 and 28. As a result, the operation angle and lift of intake valve 41 is changed continuously, while maintaining the maximum lift phase of intake valve 41 with respect to the crank angle nearly constant.

Such lift and operation angle control mechanism 20 is compact in size and excellent in the property of being installed on an engine since rocker arm 26 and links 27, 28 are concentrated around intake drive shaft 21. Further, since many joining portions between constituent parts such as a bearing portion between eccentric drive shaft portion 23 and first link 27 and a bearing portion between eccentric control shaft portion 25 and rocker arm 26 are adapted to make surface-to-surface contact with each other, lift and operation angle control mechanism 20 is easy in lubrication and excellent in durability and reliability in operation since lift and operation angle control mechanism 20 does not require any biasing means such as a return spring or the like. Further, since lift and operation angle control mechanism 20 is constructed so as to provide a direct valve drive, thus making it possible to improve the rotational speed limit with a simple and compact structure while being applicable to a current internal combustion engine having a fixed valve drive system with fixed cams, with a small change and with ease.

Figure 10A:
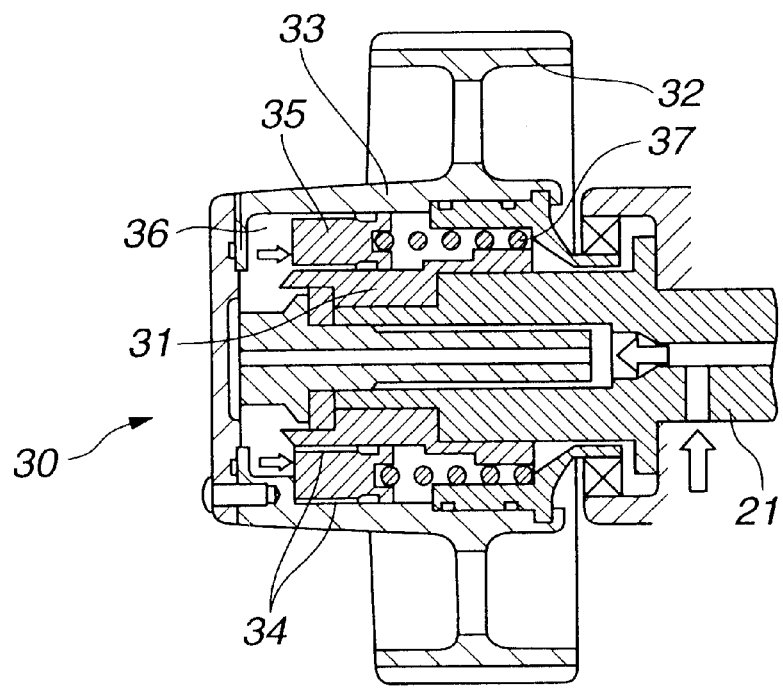
FIG. 10A is an enlarged sectional view of the phase control mechanism of FIG. 9.
Figure 10B:
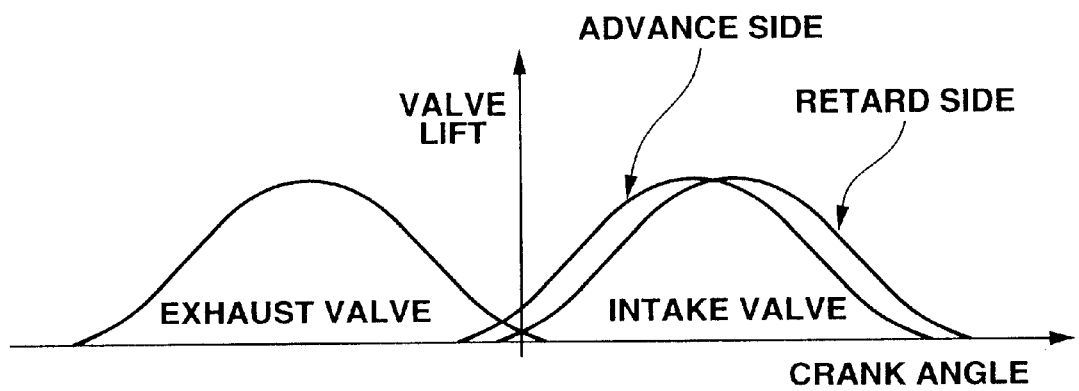
FIG. 10B is a graph showing phase control characteristics of the phase control mechanism of FIG. 10A.

Referring to FIGS. 10A and 10B, cam pulley or cam sprocket 32 is concentrically disposed on an outer circumferential end portion of intake drive shaft 21. Cam pulley or cam sprocket 32 is drivingly connected to crankshaft 1 (refer to FIG. 8) by way of a timing belt or timing chain (not shown) and is rotatable in timed relation to crankshaft 1. Phase control mechanism 30 includes radially inner gear (second rotary member) 31 rotatable with intake drive shaft 21, radially outer gear (first rotary member) 33 rotatable with cam pulley 32, and hollow cylindrical plunger 35 having helical gear portions 34, 34 respectively meshing with inner gear 31 and outer gear 33 to transmit a drive power from outer gear 33 to inner gear 31. On one side of plunger 35 is formed fluid-tight oil pressure chamber 36. By controlling the oil pressure within oil pressure chamber 36 by means of second oil pressure controller 46 (refer to FIG. 9) such as a hydraulic directional control valve, plunger 35 is caused to move axially against the bias of return spring 37, thus changing the relative phase between cam pulley 32 that meshes plunger 35 and intake drive shaft 21. This causes the maximum lift phase of intake valve 41 to change, i.e., advance or retard with respect to the crank angle.

By making reference to FIG. 9 again, the control system includes ECU (Engine Control Unit) 40 that controls, based on signals representative of a valve lift, engine load, engine speed, oil and coolant temperatures, etc., the operation of lift and operation angle control mechanism 20 and phase control mechanism 30 by outputting control signals to first oil pressure controller 45 such as a hydraulic directional control valve for controlling the oil pressure to be supplied to lift and operation angle control actuator 44, and to second oil pressure controller 46, as well as executing general engine controls such fuel injection control. Further, ECU 40 outputs control signals to compression ratio control actuator 16 (refer to FIG. 8) thereby controlling a drive by sled drive member 14. In the meantime, lift and operation angle control mechanism 20 and phase control mechanism 30 can be of the electric-operated type and compression ratio control mechanism 19 can be of the hydraulically driven type.

Referring to FIGS. 1 to 7, description will be made as to a characteristic control programatically executed by ECU 40 according to an embodiment of the present invention. In the meantime, the actual engine compression ratio that is finally determined varies depending also upon a variation of the valve lift characteristics of intake valve 41 that is caused by the operation of lift and operation angle control mechanism 20 and phase control mechanism 30. However, in this embodiment, the compression ratio that is changed only by a variation of the piston stroke that is caused by the operation of compression ratio control mechanism 19 is referred to as engine compression ratio or simply as compression ratio. The engine compression ratio is determined, for example, by detecting a movement of compression ratio control actuator 16 and the phase of control shaft 7 by means of suitable sensors (not shown) and calculating the compression ratio based on the detected results.

Figure 1:
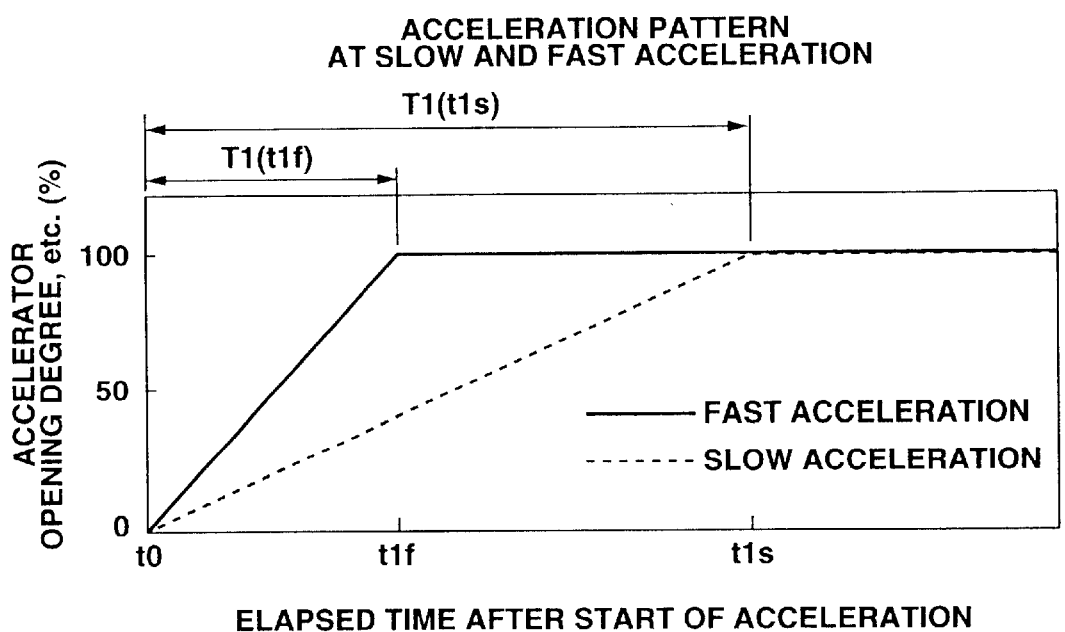
FIG. 1 is a graph showing an increase characteristic of an accelerator opening degree, etc. at slow and fast acceleration.
Figure 2:
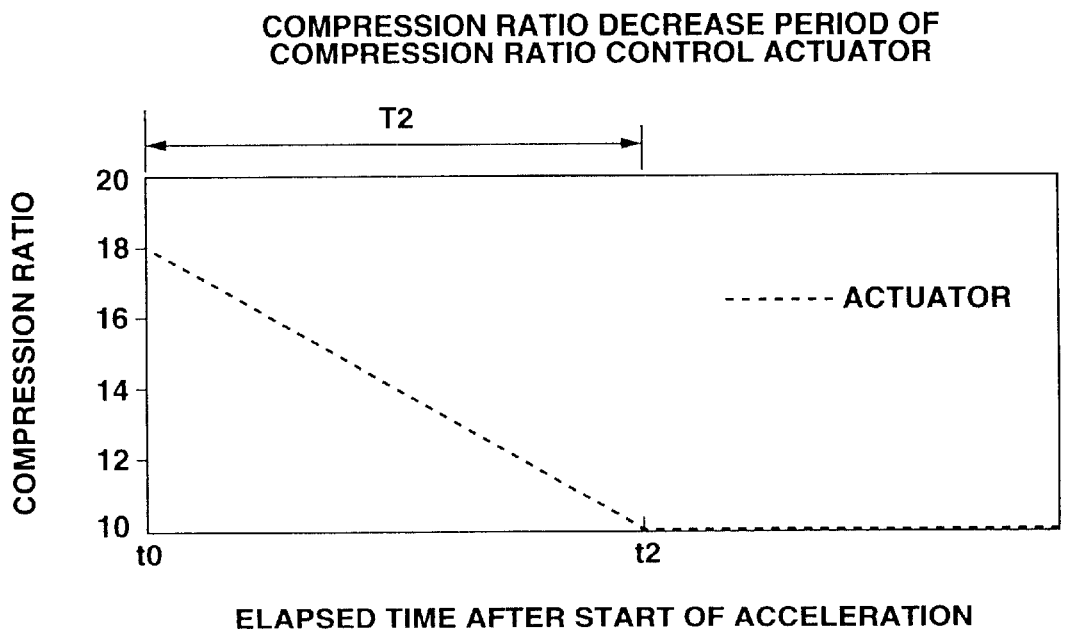
FIG. 2 is a graph showing a decrease characteristic of an engine compression ratio.
Figure 3:
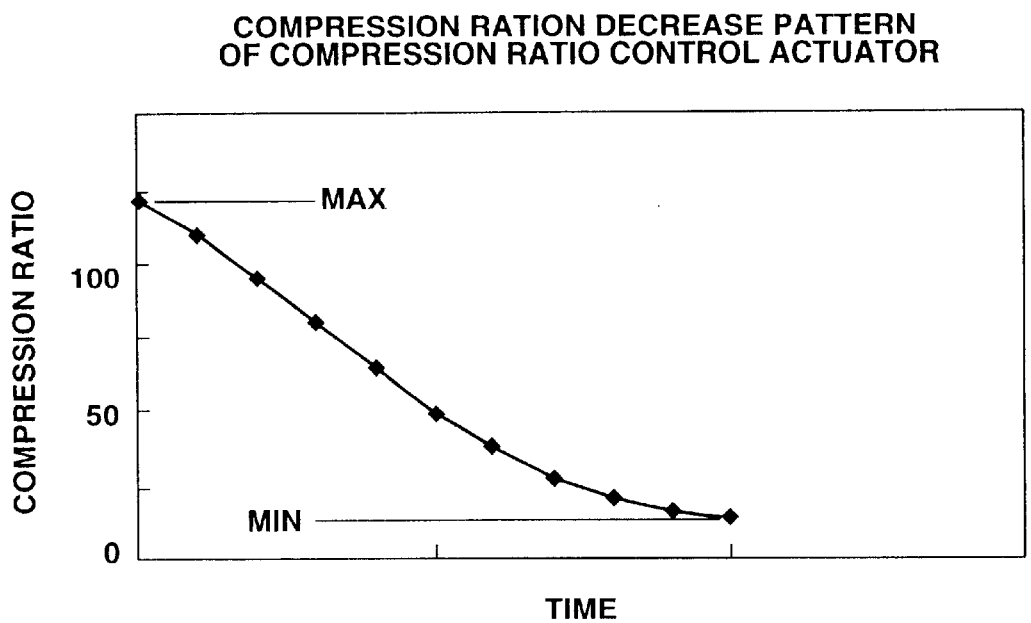
FIG. 3 is a graph showing a decrease characteristic of an actual engine compression ratio by the control of a compression ratio control actuator.
Figure 4:
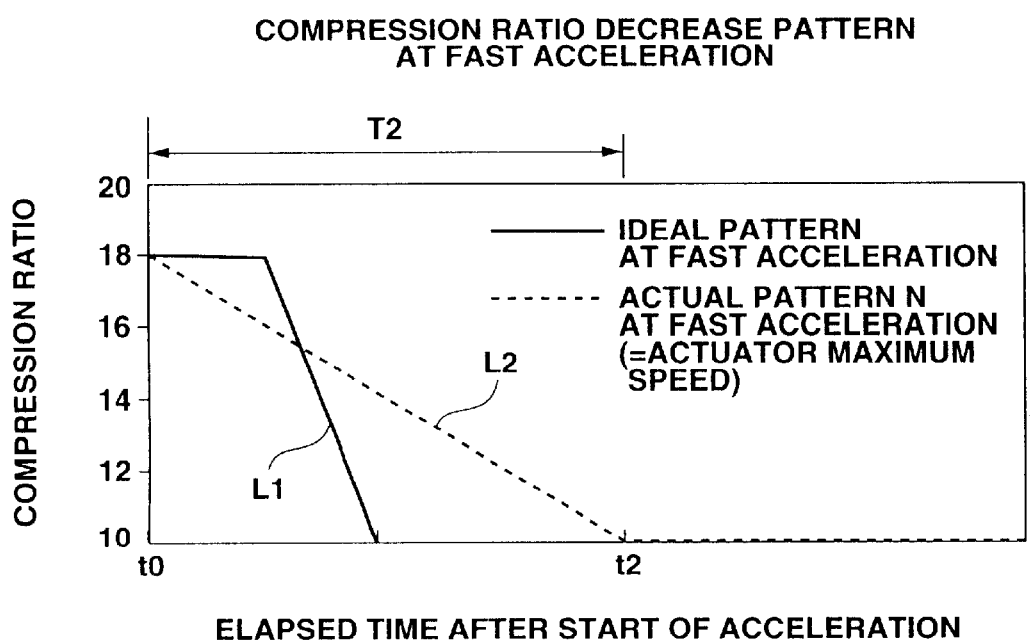
FIG. 4 is a graph showing a decrease characteristic of an engine compression ratio at fast acceleration.
Figure 5:
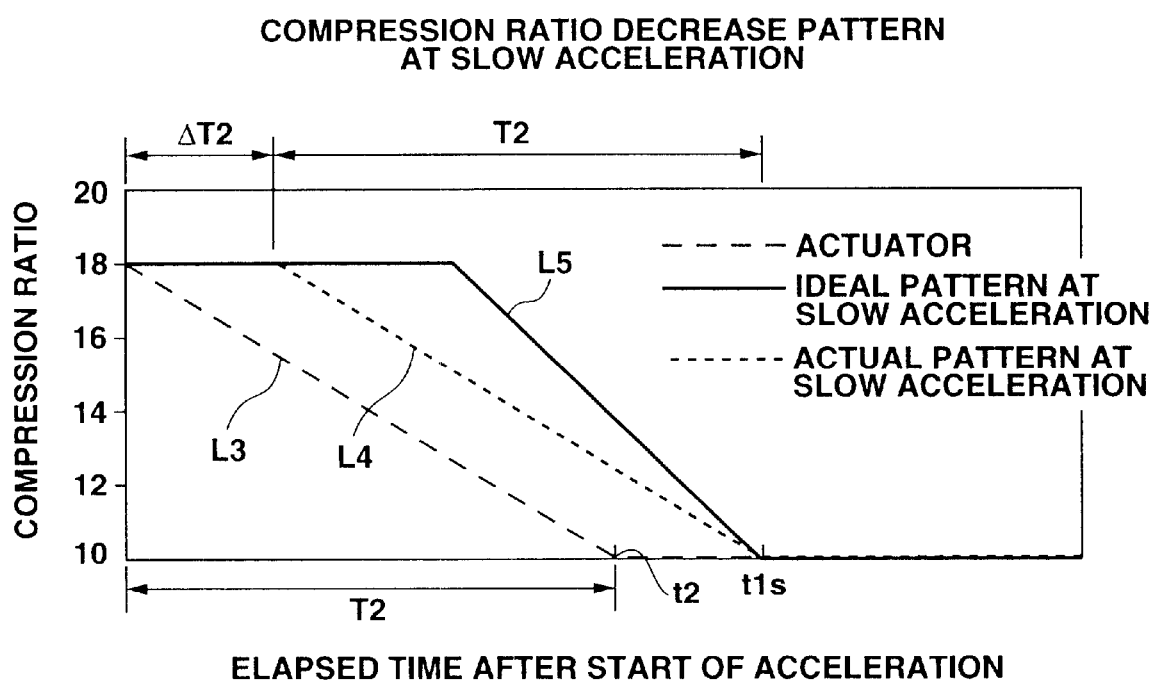
FIG. 5 is a graph showing a decrease characteristic of an engine compression ratio at slow acceleration.

Referring to FIGS. 1 and 2, the compression ratio is set high at low-load engine operating condition for the purpose of improving the fuel consumption. When engine acceleration is started, it is necessitated to decrease the engine compression ratio promptly for preventing engine knock due to an increase of engine load. In this connection, in this embodiment, it is determined at time t0 at which engine acceleration is started (or at a certain time during engine acceleration) and based on an engine acceleration parameter such as an accelerator pedal depression speed corresponding to a variation of engine speed whether the engine is in a slow or fast acceleration state. More specifically, as shown in FIG. 1, the period T1 (T1$f$, T1$s$) necessary for the engine acceleration parameter to reach a target value (e.g., for the accelerator opening degree to reach 100%) is calculated. At the same time, as shown in FIG. 2, the shortest compression ratio change period (compression ratio decrease period) T2 necessary for the compression ratio to reach a target value (e.g., about 10) is calculated. By comparison between acceleration period T1 and compression ratio variation period T2, it is determined that the engine is in a slow acceleration state when acceleration period T1 is longer than compression ratio change period T2 (T1$s$>T2) and that the engine is in a fast acceleration state when acceleration period T1 is shorter than compression ratio variation period T2 (T1$f$<T2). In the meantime, as shown in FIG. 3, the decrease characteristic of the compression ratio controlled by compression ratio control actuator 16 is not always represented by a straight line.

Description will be made further with reference to FIGS. 4 to 7. In the meantime, in FIGS. 4 to 6, solid lines L1, L5, L6 and L8 indicate an ideal decrease characteristic for reference and dotted lines L2, L3, L4 and L9 indicate the decrease characteristic that is obtained when the compression ratio is decreased at the maximum speed from beginning to end by compression ratio control actuator 16.

In a slow acceleration state (i.e., in case T1$s$>T2), the response speed of compression ratio control actuator 16 is too fast. Thus, the compression ratio decrease speed during engine acceleration is decreased so far as it does not cause engine knock or the time at which decrease of the compression ratio is started is delayed by ΔT2 as indicated by dotted line L4 in FIG. 5. In either case, a change of the engine compression ratio is finished at the time substantially the same as time t1$s$ at which engine acceleration period T1 is finished. By this, it becomes possible to increase the engine torque during engine acceleration rapidly and smoothly while avoiding engine knock during engine acceleration assuredly, thus making it possible to suppress a variation of engine torque and a deterioration of fuel consumption sufficiently.

In a fast acceleration state (i.e., in case T1*f*<T2), the compression ratio decrease speed cannot be too fast even if compression ratio control actuator 16 is operated at the maximum speed, so that the compression ratio is decreased at the maximum speed from beginning to end during engine acceleration. However, in case a sufficient compression ratio decrease speed cannot be obtained and there is a possibility of engine knock, it is necessary to avoid engine knock by retardation of the ignition timing or the like. Specifically, until the knock start time at which engine knock can occur (knock limit), the ignition timing is set at an optimum timing that enables the engine to produce a maximum torque in response to the compression ratio at that moment. When it becomes the knock start time, the minimum necessary retard amount of the ignition timing necessary for avoiding engine knock is calculated based on the compression ratio at that time, and the ignition timing is retarded. By this, it becomes possible to hold down a deterioration of fuel consumption and a decrease of engine torque to the minimum while avoiding engine knock assuredly. When this is the case, both of the engine speed and compression ratio can be changed at the maximum speed from beginning to end during engine acceleration, thus making it possible to complete engine acceleration in a short time. In the meantime, when the difference between the engine compression ratio and the target compression ratio exceeds a predetermined level, it can be determined that the above described knock start time has come, and the retard amount of the ignition timing can be calculated based on that difference.

Description will be made as to the case where as the above-described acceleration parameter is used (1) an accelerator pedal depression speed that is obtained on the basis of an accelerator depression amount detected by an accelerator sensor (not shown), etc., (2) a throttle opening speed that is obtained on the basis of a throttle valve opening degree detected by a throttle sensor (not shown), etc., or (3) a change speed of an intake valve operation angle or lift that is obtained on the basis of an angle of control shaft 24 of lift control mechanism 20 detected by an angle sensor (not shown), etc.

(1) At acceleration start time t0, period T1 necessary for an accelerator depression amount to reach a maximum value (target value) is calculated based on an accelerator depression speed. At the same time, shortest compression ratio variation period T2 necessary for decrease from the compression ratio at acceleration start time t0 to the target compression ratio is calculated, and comparison between T1 and T2 is made. In case T1>T2 (i.e., the engine is in a slow acceleration state), at least the compression ratio decrease speed is decreased so that the maximum torque is generated at each moment from start to end of engine acceleration, or the decrease start time is delayed. In case T1<T2 (i.e., the engine is in a fast acceleration state), the engine compression ratio is decreased at the maximum speed from beginning to end.

(2) At acceleration start time t0, time T1 necessary for a throttle opening degree to reach a full throttle (target value) is calculated on the basis of a throttle opening speed. At the same time, shortest compression ratio variation period T2 necessary for decrease from the compression ratio at acceleration start time t0 to the target compression ratio is calculated, and comparison between T1 and T2 is made. In case T1>T2 (i.e., the engine is in a slow acceleration state), at least the compression ratio decrease speed is decreased so that the maximum torque is generated at each moment from start to end of engine acceleration, or the decrease start time is delayed. In case T1<T2 (i.e., the engine is in a fast acceleration state), the engine compression ratio is decreased at the maximum speed from beginning to end.

Figure 6A:
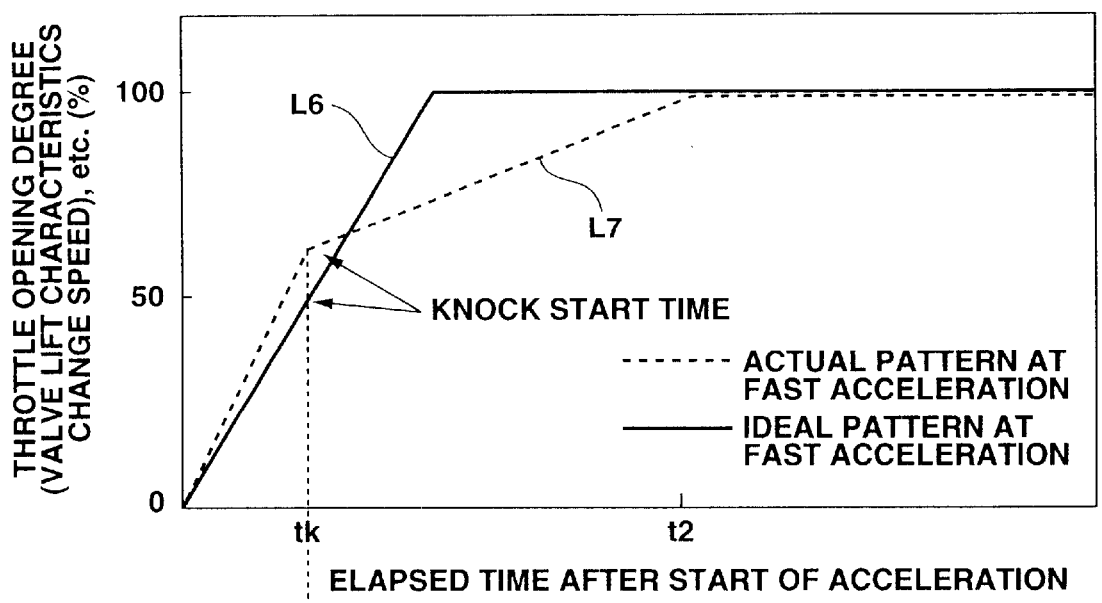
FIG. 6A is a graph showing an increase characteristic of a throttle opening degree, etc.

In case the throttle opening is changed by an electronic control, in the above-described fast acceleration state, it is executed, as indicated by dotted line L7 in FIG. 6A, a control for allowing the throttle opening to increase at the maximum speed until knock start time tk at which a possibility of engine knock is caused, and after knock start time tk, the throttle opening speed is decreased, in response to the engine compression ratio at every moment, to such a speed at which engine knock is not generated. By maximizing the throttle opening speed from the time immediately after start of engine acceleration to knock start time tk, it becomes possible to improve the engine torque and fuel consumption at the same time. Further, by decreasing the throttle opening speed after knock start time tk so that the throttle opening reaches the target value at time t2 at which compression ratio change period T2 is ended, it becomes possible to increase the engine torque until the time at which decrease of the engine compression ratio is finished (i.e., the time at which maximum engine torque is obtained) while preventing engine knock due to the delay in decreasing the engine compression ratio in response to increase of the throttle opening.

(3) At acceleration start time t0, period T1 necessary for the operation angle or lift amount to reach the maximum value (target value) is calculated based on the operation angle of lift and operation angle control mechanism 20 on the intake side. Further, shortest time T2 necessary for decreasing the engine compression ratio to the smallest engine compression ratio is calculated. Then, comparison between T1 and T2 is made. In case T1>T2, at least the decrease speed of the engine compression ratio is decreased or the decrease start time is delayed so that the maximum engine torque is generated at every moment from start to end of engine acceleration. In case T1<T2, the engine compression ratio is decreased at the maximum speed from beginning to end to the smallest engine compression ratio.

Figure 6B:
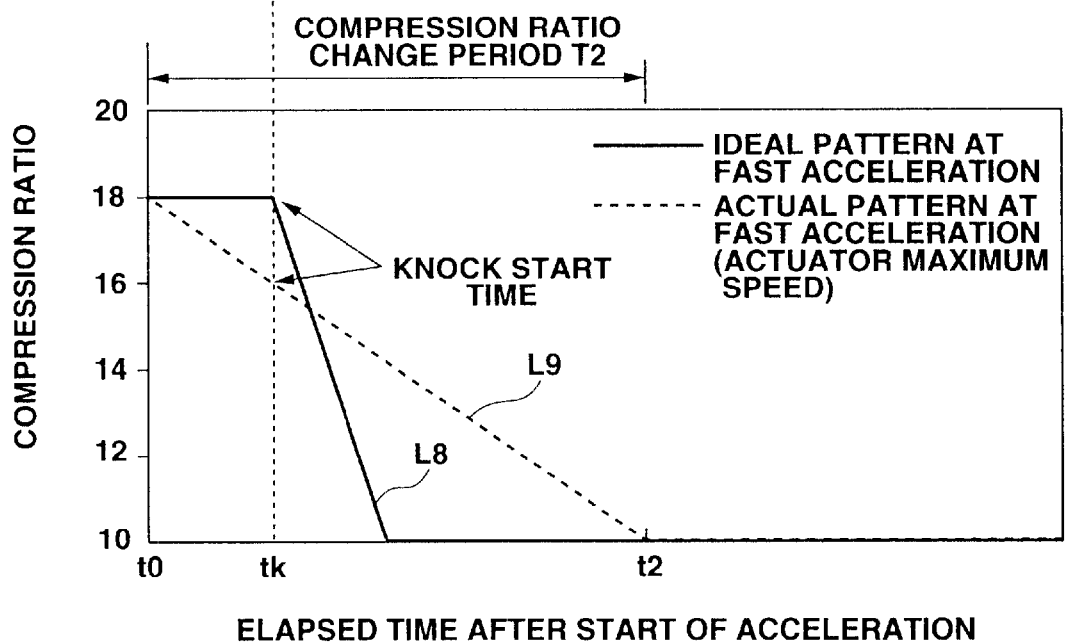
FIG. 6B is a graph showing a decrease characteristic of an engine compression ratio.
Figure 7A:
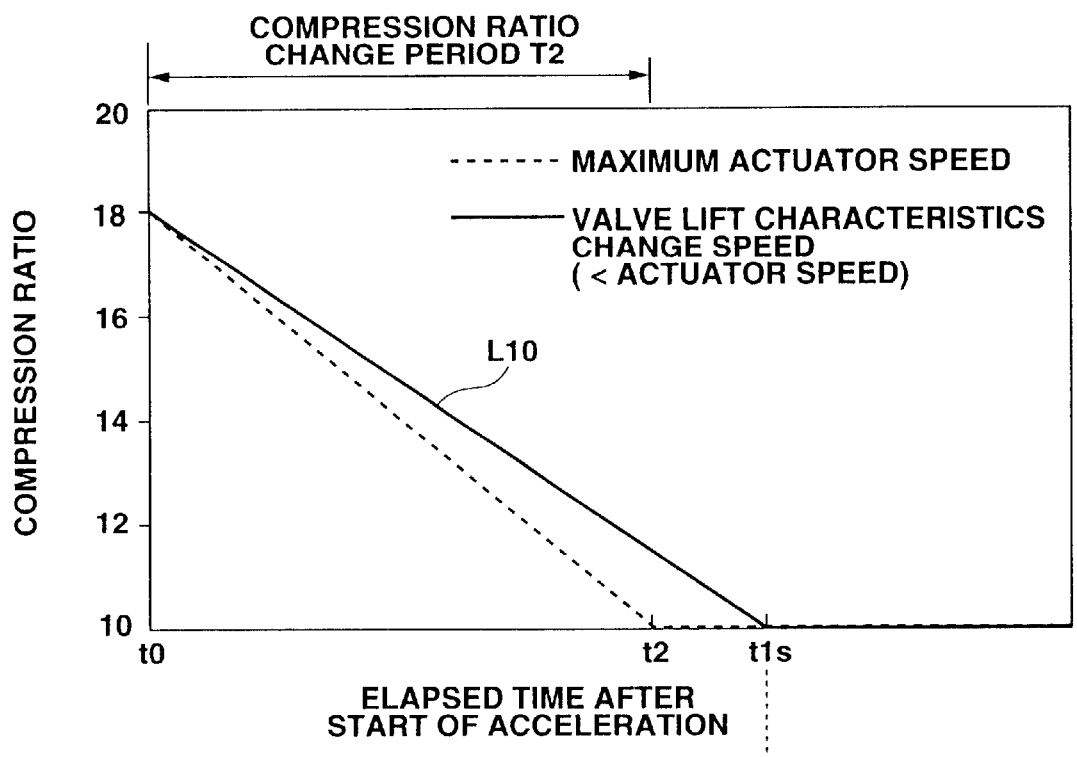
FIG. 7A is a graph showing a decrease characteristic of an engine compression ratio.
Figure 7B:
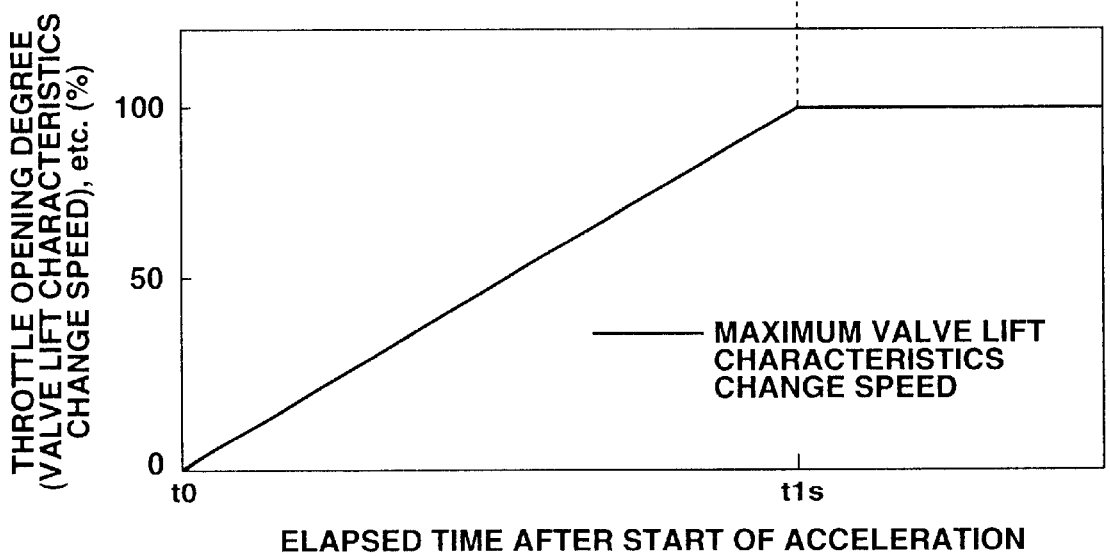
FIG. 7B is a graph showing an increase characteristic of a throttle opening degree, etc.

In the fast acceleration state (T1<T2) and in case the response speed of compression ratio control actuator 16 is slow with respect to a variation of the operation angle and lift amount, the engine compression ratio is decreased at the maximum speed at all time as indicated by dotted line L9 in FIG. 6B. On the other hand, as indicated by dotted line L7 of FIG. 6A, the increase speed of the operation angle or lift of lift and operation angle control mechanism 20 is maximized until knock start time tk before which there is no possibility of engine knock and, after knock start time tk, decreased to such a speed that does not cause engine knock in response to the engine compression ratio at every moment during decrease of the compression ratio. By this, it becomes possible to increase the engine torque smoothly up to the maximum torque that is obtained when decrease of the compression ratio is completed while preventing engine knock due to the delay in decreasing the engine compression ratio in response to increase of the operation angle or lift.

In case the response speed of compression ratio control actuator 16 is too fast with respect to a variation of the operation angle and the lift (T1>T2), the operation angle or lift of intake valve 41 is increased at the maximum speed from the time immediately after start of acceleration. On the other hand, as indicated by solid line L10 in FIG. 7A, the decrease speed of the compression ratio is lowered or as indicated by dotted line L4 in FIG. 5, the decrease start time at which decrease of the compression ratio is started is delayed by ΔT2. In either case, the change of the compression ratio is finished at substantially the same time as finish time t1s at which acceleration period T1s is ended. By this, it becomes possible to increase the engine torque smoothly until acceleration finish time t1s in response to the operation angle and lift of intake valve 41 at every moment while avoiding engine knock assuredly.

In the meantime, as shown in FIG. 8, in compression ratio control mechanism 19 of this embodiment, piston 4 and crank pin 11 are mechanically connected by means of upper link 5 and lower link 2. To lower link 2 is connected compression ratio control actuator 16 by way of control link 6 and control shaft 7. Thus, the combustion load on piston 3 is applied to compression ratio actuator 16 by way of upper link 5, lower link 2, control link 6 and control shaft 7. Accordingly, the change speed (response speed) of the compression ratio at the time of change toward a lower compression ratio is faster as compared with the change speed of the compression ratio at the time of change toward a higher compression ratio, so that there is a tendency that the compression ratio decrease speed during the time of change from the highest compression ratio to the middle compression ratio is higher than the compression ratio decrease speed during the time of change from the middle compression ratio to the lowest compression ratio (target compression ratio). From this point, it becomes possible to decrease the engine compression ratio rapidly during engine acceleration.

From the foregoing, it will be understood that according to the present invention, it is determined at start of engine acceleration whether an engine is in a slow or fast acceleration state on the basis of an acceleration parameter corresponding to a variation of engine speed and an engine compression ratio is controlled on the basis of a result of determination. Accordingly, it becomes possible to execute a prompt and exact control of the engine compression ratio from the time immediately after start of engine acceleration, thus making it possible to improve the engine performance properties such as fuel consumption and torque. Enumerated as the acceleration parameter are an accelerator depression speed, throttle opening degree, valve lift characteristics such as an operation angle and lift, that are controlled by a variable valve timing control apparatus.

It will be further understood that according to the present invention, in the slow acceleration state, at least the decrease speed of the engine compression ratio is decreased or the decrease start time is delayed in order to prevent the engine compression ratio from becoming too low during engine acceleration. On the other hand, in the fast acceleration state, the engine compression ratio is preferably decreased at the maximum speed from beginning to end for the purpose of decreasing the engine compression ratio promptly. Further, in order to avoid engine knock in the fast acceleration state, the knock start time at which a possibility of engine knock during engine acceleration is caused is calculated and after the knock start time, the ignition timing is delayed or the increase speed of the engine speed is decreased.

The entire contents of Japanese Patent Application P2001-282924 (filed Sep. 18, 2001) are incorporated herein by reference.

Although the invention has been described above by reference to a certain embodiment of the invention, the invention is not limited to the embodiment described above.

Modifications and variations of the embodiment described above will occur to those skilled in the art, in light of the above teachings. The scope of the invention is defined with reference to the following claims.

What is claimed is:

1. A control system for an internal combustion engine comprising:
    a compression ratio control mechanism capable of changing an engine compression ratio; and
    a control unit for controlling the compression ratio control mechanism in accordance with an acceleration state of the engine;
    the control unit including:
        an acceleration parameter obtaining section for obtaining an acceleration parameter corresponding to a change of an engine speed;
        an acceleration determining section for determining whether the engine is in a slow or fast acceleration state on the basis of the acceleration parameter; and
        a control section for controlling at least one of a compression ratio change speed at which the engine compression ratio during engine acceleration is changed and a compression ratio change start time at which a change of the engine compression ratio during engine acceleration is started, on the basis of whether the engine is in a slow or fast acceleration state.

2. The control system according to claim 1, wherein the acceleration parameter comprises an accelerator depression speed.

3. The control system according to claim 1, wherein the acceleration parameter comprises a throttle opening speed.

4. The control system according to claim 1, further comprising a variable valve timing control apparatus capable of changing valve lift characteristics of an intake valve of the engine, wherein the acceleration parameter comprises a change speed at which the valve lift characteristics are changed.

5. The control system according to claim 1, wherein the acceleration determining section calculates an acceleration period necessary for the acceleration parameter to reach a target value, calculates a compression ratio change period necessary for the engine compression ratio to reach a target compression ratio, compares the acceleration period and the compression ratio change period with each other, determines that the engine is in a slow acceleration state when the acceleration period is longer than the compression ratio change period, and determines that the engine is in a fast acceleration state when the acceleration period is shorter than the compression ratio change period.

6. The control system according to claim 1, wherein the control section decreases a compression ratio decrease speed at which the engine compression ratio during engine acceleration is decreased when the engine is in a slow acceleration state.

7. The control system according to claim 1, wherein the control section delays a compression ratio decrease start time at which decrease of the engine compression ratio during engine acceleration is started when the engine is in a slow acceleration sate.

8. The control system according to claim 1, wherein the control section decreases the engine compression ratio during engine acceleration at a maximum speed from beginning to end when the engine is in a fast acceleration state.

9. The control system according to claim 1, wherein the control section calculates, when the engine is in a fast acceleration state, a knock start time at which a possibility of engine knock is caused, and retards an ignition timing after the knock start time.

10. The control system according to claim 1, wherein the control section calculates, when the engine is in a fast acceleration state, a knock start time at which a possibility of knock is caused, and decreases an increase speed at which an engine speed is increased.

11. A control system for an internal combustion engine comprising:

a compression ratio control mechanism capable of varying an engine compression ratio;

acceleration parameter obtaining means for obtaining an acceleration parameter corresponding to a change of an engine speed;

acceleration determining means for determining whether the engine is in a slow or fast acceleration state on the basis of the acceleration parameter; and control means for controlling at least one of a compression ratio change speed at which the engine compression ratio during engine acceleration is changed and a compression ratio change start time at which a change of the engine compression ratio during engine acceleration is started, on the basis of whether the engine is in a slow or fast acceleration state.

12. A control method for an internal combustion engine having a compression ratio control mechanism capable of changing an engine compression ratio, the control method comprising:

obtaining an acceleration parameter corresponding to a change of an engine speed;

determining whether the engine is in a slow or fast acceleration state on the basis of the acceleration parameter; and controlling at least one of a compression ratio change speed at which the engine compression ratio during engine acceleration is changed and a compression ratio change start time at which a change of the engine compression ratio during engine acceleration is started, on the basis of whether the engine is in a slow or fast acceleration state.

13. The control method according to claim 12, wherein the acceleration parameter comprises an accelerator depression speed.

14. The control method according to claim 12, wherein the acceleration parameter comprises a throttle opening speed.

15. The control method according to claim 12, wherein the engine further includes a variable valve timing control apparatus capable of changing valve lift characteristics of an intake valve of the engine, and wherein the acceleration parameter comprises a change speed at which the valve lift characteristics are changed.

16. The control system according to claim 12, wherein the determining comprises calculating an acceleration period necessary for the acceleration parameter to reach a target value, calculating a compression ratio change period necessary for the engine compression ratio to reach a target compression ratio, comparing the acceleration period and the compression ratio change period with each other, determining that the engine is in a slow acceleration state when the acceleration period is longer than the compression ratio change period, and determining that the engine is in a fast acceleration state when the acceleration period is shorter than the compression ratio change period.

17. The control method according to claim 12, wherein the controlling comprises decreasing a compression ratio decrease speed at which the engine compression ratio during engine acceleration is decreased when the engine is in a slow acceleration state.

18. The control method according to claim 12, wherein the controlling comprises delaying a compression ratio decrease start time at which decrease of the engine compression ratio during engine acceleration is started when the engine is in a slow acceleration state.

19. The control method according to claim 12, wherein the controlling comprises decreasing the engine compression ratio during engine acceleration at a maximum speed from beginning to end when the engine is in a fast acceleration state.

20. The control method according to claim 12, wherein the controlling comprises calculating, when the engine is in a fast acceleration state, a knock start time at which a possibility of engine knock is caused, and retarding an ignition timing after the knock start time.

21. The control method according to claim 12, wherein the controlling comprises calculating, when the engine is in a fast acceleration state, a knock start time at which a possibility of knock is caused, and decreasing an increase speed at which an engine speed is increased.

* * * * *